(12) United States Patent
Nothum, Jr.

(10) Patent No.: US 10,306,912 B2
(45) Date of Patent: Jun. 4, 2019

(54) FOOD PRODUCT COATING APPARATUS FOR PANKO CRUMB AND THE LIKE

(71) Applicant: Robert G. Nothum, Jr., Willard, MO (US)

(72) Inventor: Robert G. Nothum, Jr., Willard, MO (US)

( * ) Notice: Subject to any disclaimer, the term of this patent is extended or adjusted under 35 U.S.C. 154(b) by 365 days.

(21) Appl. No.: 15/376,897

(22) Filed: Dec. 13, 2016

(65) Prior Publication Data

US 2017/0224005 A1  Aug. 10, 2017

Related U.S. Application Data

(63) Continuation of application No. 14/460,852, filed on Aug. 15, 2014, now Pat. No. 9,521,862.

(60) Provisional application No. 61/866,596, filed on Aug. 16, 2013.

(51) Int. Cl.
| | |
|---|---|
| *A23P 20/12* | (2016.01) |
| *B05C 19/06* | (2006.01) |
| *B05C 19/04* | (2006.01) |
| *A21C 9/04* | (2006.01) |

(52) U.S. Cl.
CPC .............. *A23P 20/12* (2016.08); *A21C 9/04* (2013.01); *B05C 19/04* (2013.01); *B05C 19/06* (2013.01)

(58) Field of Classification Search
CPC ... A23P 20/12; A21C 9/04; A21C 9/08; A21C 15/002; A23G 3/2076; A23G 9/245; B05C 19/06; B05C 19/04; A23L 13/03; A23L 17/75; A23L 7/157; A47J 37/1214; B26D 7/0625
See application file for complete search history.

(56) References Cited

U.S. PATENT DOCUMENTS

| | | | |
|---|---|---|---|
| 2,619,051 A | 11/1952 | Rice | 425/238 |
| 2,731,942 A | 1/1956 | Anderson | 118/16 |
| 2,817,862 A | 12/1957 | Frazho | 15/102 |
| 3,543,916 A | 12/1970 | Berk | 198/220 |
| 3,547,075 A | 12/1970 | Johnson | 118/16 |
| 3,689,280 A | 9/1972 | Werner | 426/249 |
| 3,759,218 A | 9/1973 | Korstvedt | 118/18 |
| 3,967,583 A | 7/1976 | Booth | 118/16 |
| 4,333,415 A | 6/1982 | Miller et al. | 118/16 |
| 4,497,244 A | 2/1985 | Koppens | 99/494 |

(Continued)

OTHER PUBLICATIONS

PCT International Search Report, Appln. No. PCT/US 14/51305 dated Nov. 19, 2004.

(Continued)

*Primary Examiner* — Michele L Jacobson
(74) *Attorney, Agent, or Firm* — Jonathan A. Bay

(57) ABSTRACT

A food product coating apparatus has a main conveyor, a coating-material spreading system for spreading coating material across the main conveyor, and a coating-material recirculation system for recirculating excess-coating material spilling out the discharge end of the main conveyor. The recirculation system has at least one transverse collection conveyor and at least one counter-flow return conveyor, both of which like the main conveyor made of solid web material. The coating-material spreading system comprises a first overhead sifting loader near the intake end and a spaced away second overhead sifting loader. A food-product inflow conveyor transfers an inflow of food product to the main conveyor between the first and second loaders.

16 Claims, 5 Drawing Sheets

(56) References Cited

U.S. PATENT DOCUMENTS

| | | | |
|---|---|---|---|
| 4,808,423 A | 2/1989 | Hansson | 423/273 |
| 5,052,330 A | 10/1991 | Stacy | 118/16 |
| 5,236,502 A | 8/1993 | Wadell | 118/24 |
| 5,238,293 A | 8/1993 | Gibson | 118/16 |
| 5,284,514 A | 2/1994 | Griffiths | 118/23 |
| 5,331,874 A | 7/1994 | Foster | 198/626.6 |
| 5,643,361 A | 7/1997 | Wadell | 118/16 |
| 6,158,332 A | 12/2000 | Nothum, Sr. et al. | 99/494 |
| 6,305,274 B1 | 10/2001 | Nothum, Sr. et al. | 99/404 |
| 6,510,810 B2 | 1/2003 | Nothum, Sr. et al. | 118/26 |
| 6,644,237 B2 | 11/2003 | Rooke | 118/19 |
| 7,231,885 B1 | 6/2007 | Nothum, Jr. et al. | 118/13 |
| 2003/0079678 A1 | 5/2003 | Zeegers et al. | 118/16 |
| 2008/0283366 A1 | 11/2008 | Karpinsky et al. | 198/763 |
| 2009/0038542 A1 | 2/2009 | Paschoalini et al. | 118/16 |
| 2011/0097459 A1 | 4/2011 | Bakos et al. | 426/289 |

OTHER PUBLICATIONS

PCT Written Opinion, Appln. No. PCT/US 14/51305 dated Nov. 19, 2014.

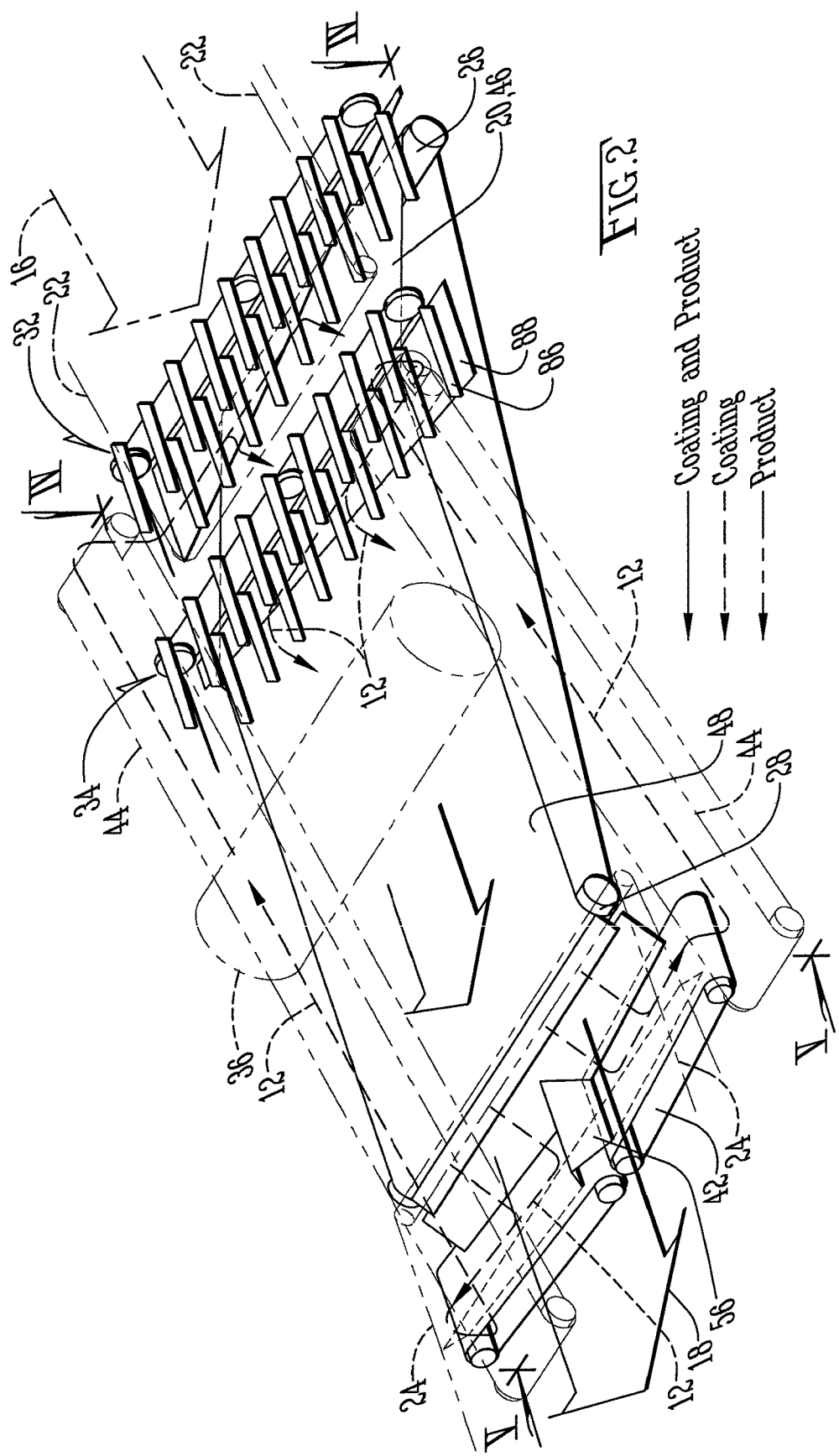

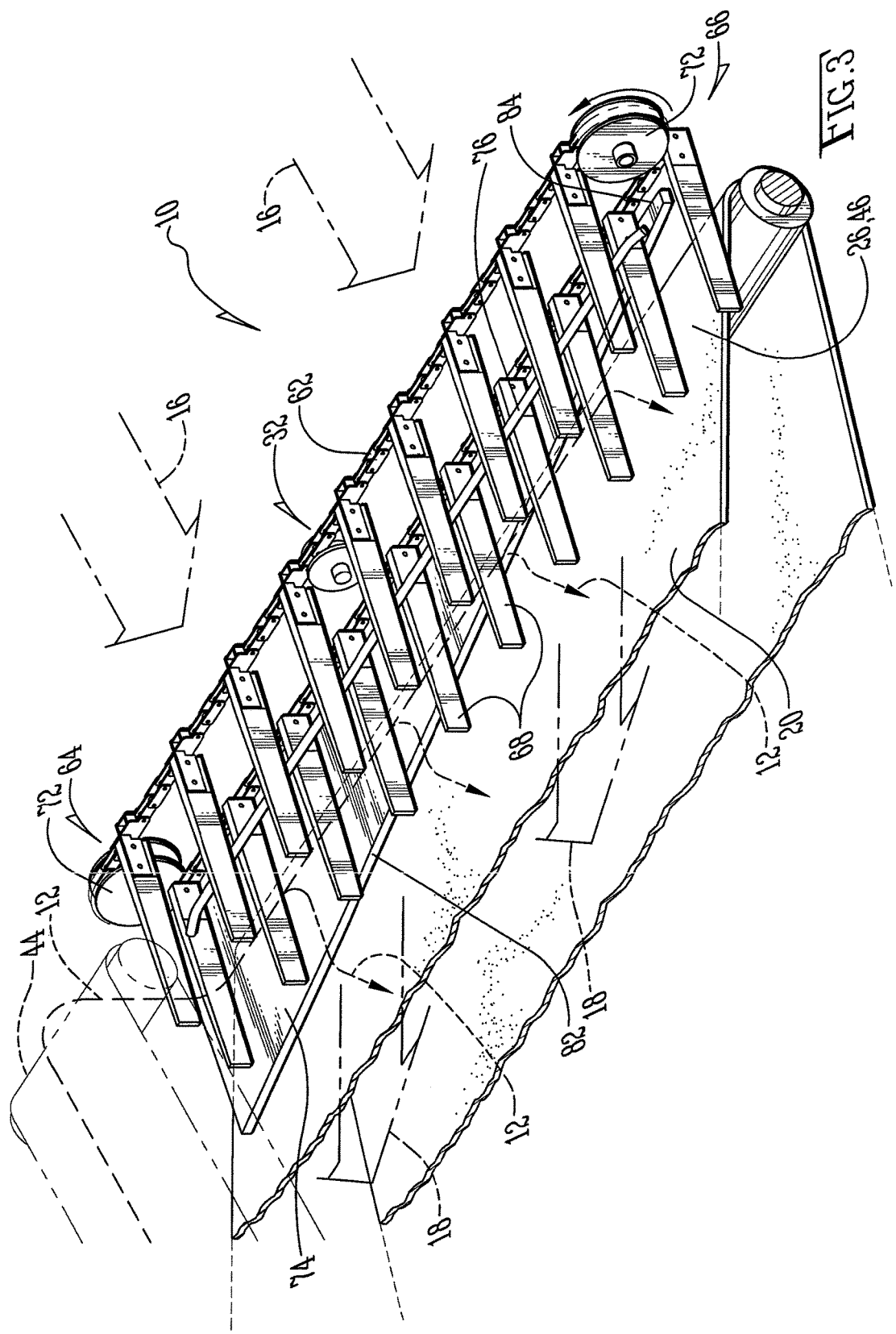

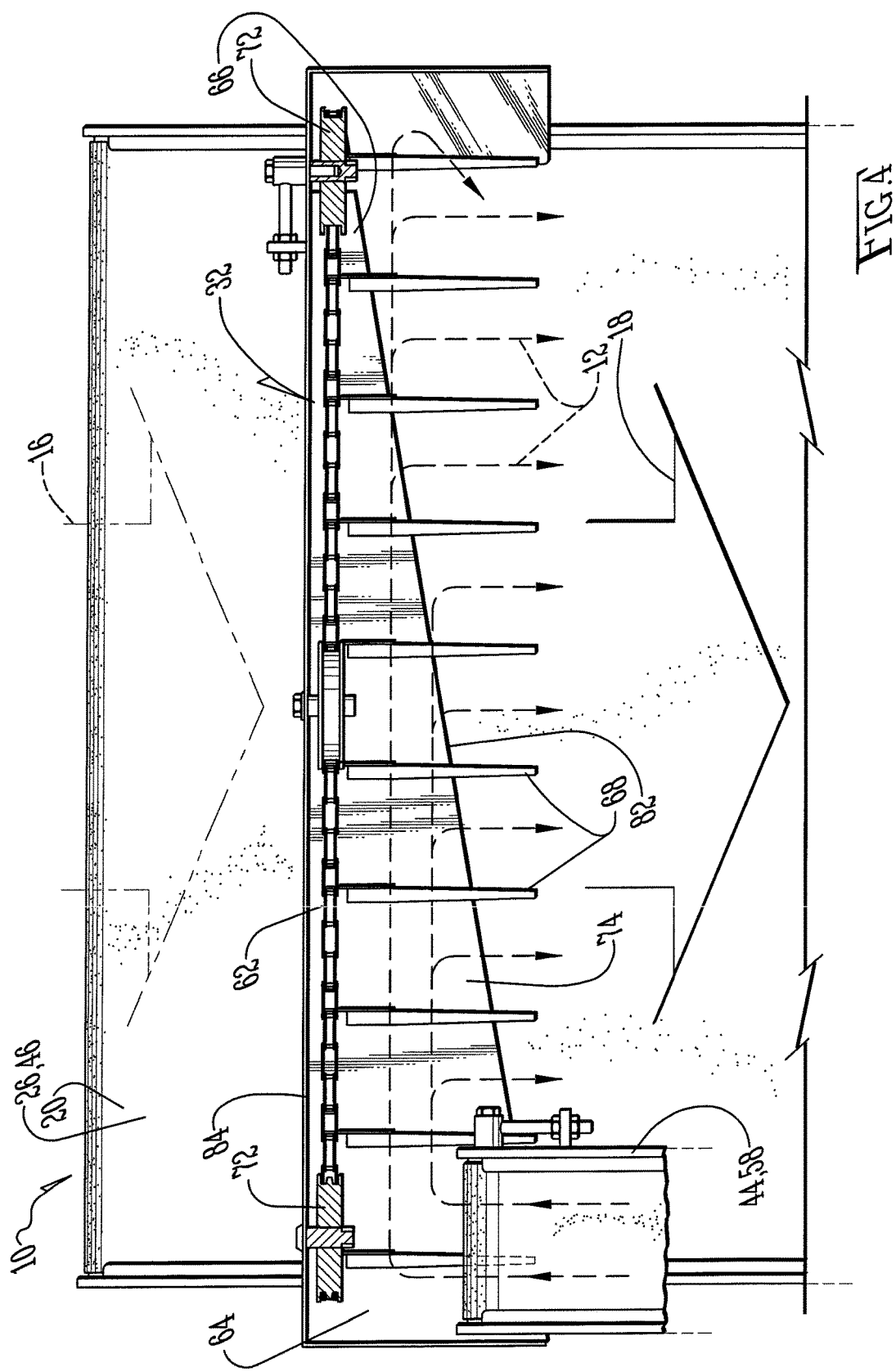

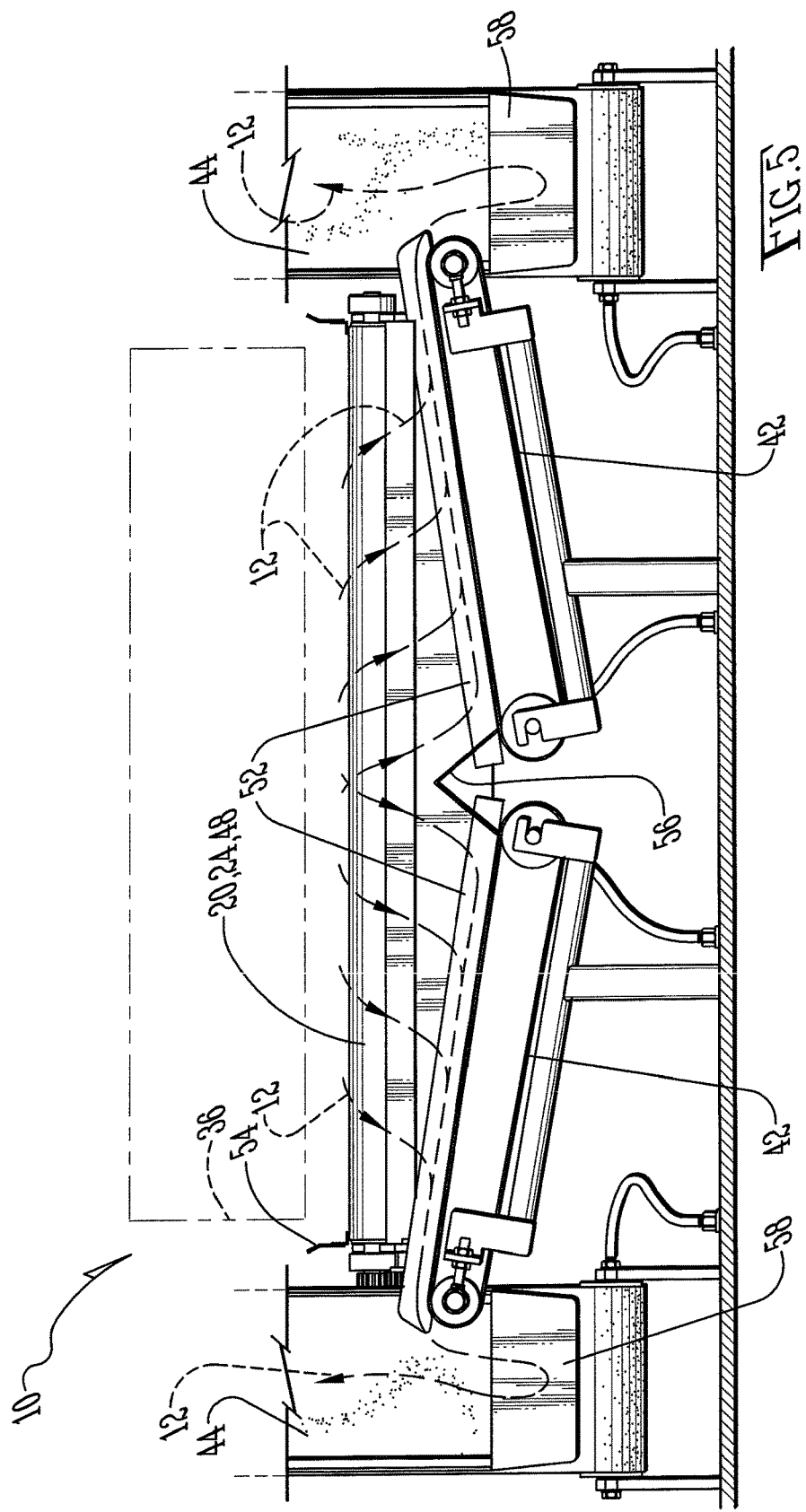

FOOD PRODUCT COATING APPARATUS FOR PANKO CRUMB AND THE LIKE

CROSS-REFERENCE TO PROVISIONAL APPLICATION(S)

This application claims the benefit of U.S. Provisional Application No. 61/866,596, filed Aug. 16, 2013, the foregoing disclosure for which is incorporated herein by this reference thereto.

BACKGROUND OF THE INVENTION

The invention relates to commercial-scale food product coating apparatus and, more particularly, to coating apparatus adapted for a high-moisture content, gauzy coating material such as and without limitation Panko-style, Japanese-introduced bread crumb.

On the date accessed as given next, the online encyclopedia "Wikepedia" had an article on what is Panko. http://en.wikipedia.org/wiki/Panko (accessed Jan. 5, 2012). It recites in part:

Panko is a variety of flaky bread crumb used in Japanese cuisine as a crunchy coating for fried foods, such as tonkatsu. Panko is made from bread baked by passing an electric current through the dough, yielding bread without crusts, and it has a crisper, airier texture than most types of breading found in Western cuisine. Outside Japan, it is becoming more popular for use in Asian and non-Asian dishes, is often used on fish and seafood, and is often available in Asian markets and specialty stores. Increasingly, it is also available in many large supermarkets. Panko is produced worldwide, particularly in Asian countries, including Japan, Korea, Thailand, China, and Vietnam.

From the perspective of a long-experienced designer of commercial-scale coating apparatus for food products (eg., the inventor hereof), there are many more things to say about Panko than just that.

To date, food product coating material for commercial-scale food process lines has typically been either a substantially dry particulate (eg., flour, spices, desiccated bread crumbs, mixtures thereof and the like) or else a substantially thick viscous fluid (eg., batter). A machine which can handle one typically cannot handle the other. For example, contrast food coating apparatus for dry particulate, such as:—

U.S. Pat. No. 6,158,332—Convertible drum-type coating apparatus (Nothum, Sr., et al.), or U.S. Pat. No. 7,231,885—Food coating and compressor apparatus (Nothum, Jr., et al.), to food coating apparatus for batter, such as:—

U.S. Pat. No. 6,510,810—Convertible combination batter mixer and applicator machine (Nothum, Sr., et al.).

Along with U.S. Pat. No. 6,305,274—Fryer for Food Process Lines (Nothum, Sr., et al.), the foregoing patent disclosures are incorporated herein in full by this reference thereto.

Panko—as a coating material—has properties which distinguish it greatly from both dry particulate (on one extreme) and thick viscous fluids (at the other extreme). Panko poses several challenges for the designer of commercial-scale food coating apparatus. In the spectrum of coating materials between dry particulate and thick viscous fluids, it definitely lies in the middle:—in a class by itself.

Panko somewhat resembles in appearance and gauziness something like loose-fill blown-in insulation, except Panko has a high moisture content. Put differently, Panko is like a lot of smallish cotton tufts, except (again), Panko has a high moisture content. The freshest Panko has moisture contents of anywhere from about 40 to 50% (forty to fifty percent). It can be squished easily into doughy cakes or lumps. However, Panko can be dried to reduce its moisture content.

And it is believed that the prior art solutions to handling Panko-like materials in commercial food product coating apparatus have done just that. That is, Panko was dried in an oven or otherwise dried to get the moisture content down to where the material will run through a machine which is substantially designed for a dry particulate coating material.

Properly fresh and moist Panko (wet Panko) will not run through such machines. Indeed, fresh moist Panko will clog up both kinds of machines which are conventionally designed for (i) coating with dry particulate or, at the other extreme (ii) coating with a thick viscous fluid (batter).

For dry particulate material, the inventor hereof ordinarily prefers to design conveyors with either (1) open wire mesh construction, or else (2) drag-link construction. For an example of open wire mesh construction, see U.S. Pat. No. 6,305,274—Nothum, Sr., et al., and FIG. 6 therein. For an example of drag-link construction, see U.S. Pat. No. 6,158,332—Nothum, Sr., et al., and FIG. 4 therein.

With either conveyor construction, and when motivating dry particulate material in the direction of conveyance, both those kinds of conveyors typically have their coating-material motivating runs scraping over a solid support panel. Dry particulate material is easily conveyed by such conveyor constructions.

The problem with Panko and Panko-like materials for open wire mesh construction is the following. That is, Panko will stick fast to the underlying support panel. Then the Panko builds its own ramp. Pretty soon, the wire mesh belt is running on top of the mound of Panko—and not directly scraping across the underlying support panel.

Again, an accretion of Panko gets in between the belt and the underlying support panel, and this frustrates the purpose of the wire mesh belts. Belts can become over-tensioned to the point of overwhelming the drive power of the motors or drive transmission components. Also, the mound of Panko does not clean off easy. It cleans off as difficult as plaster, posing concerns for sanitary standards.

The other conveyor option for dry particulate material is typically drag-link conveyors, which have open cells (or pockets). If Panko were run through a drag-link conveyor, it would gum up the inside niche of each of the open cells (or pockets). The stuck and drying Panko would form a cemented solid inside each such niche of each cell or pocket. That might not only cripple the machine, but also the gummed-in Panko would be difficult to clean out. The machine would be inoperable again, and unsanitary as well.

Fluid handling apparatus are, needless to say, fluid handling apparatus. See, eg., U.S. Pat. No. 6,510,810—Convertible combination batter mixer and applicator machine (Nothum, Sr., et al.). For fluid handling apparatus, there are plumbing conduits with elbows and valves:—elements which pose a possible place for flowing semi-solids that readily squish, to squish so, and let their moisture content squeeze out. Thereafter, the squished semi-solid silts up, gums up, and, hardens. Panko does just that. Panko is not a fluid.

What is needed is a coating apparatus for food product which accommodates substantially most of the challenges of handling a coating material like Panko, which is neither a dry particulate nor else a fluid (however thick).

SUMMARY OF THE INVENTION

The objects of and problems to be solved by the invention are provided according to a food product coating apparatus characterized by and without limitation a main conveyor, a coating-material spreading system for spreading coating material across the main conveyor, and a coating-material recirculation system for recirculating excess-coating material taken away by discharged food product as a coating layer thereon.

The main conveyor is elongated along a longitudinal food-product flow direction between an intake end and a discharge end, and comprises an endless belt having a food-product carrying run and a return run. The coating-material spreading system spreads coating material over the food-product carrying run of the main conveyor. The recirculation system collects excess-coating material spilling over the discharge end of the main conveyor and returns the excess-coating material to the coating-material spreading system.

It is an aspect of the invention that the endless belt of the main conveyor comprises a web of solid material. Preferably the solid web material comprises food grade conveyor belt reinforced with KEVLAR® cord.

Preferably the coating-material spreading system comprises a first coating-material loading system for loading excess-coating material transversely across the food-product carrying run of the main conveyor proximate the intake end, and, a second coating-material loading system for sprinkling excess-coating material transversely across the food-product carrying run of the main conveyor between the first coating-material loading system and the discharge end of the main conveyor. Given the foregoing, a food-product inflow conveyor is adapted to transfer an inflow of food product to the food-product carrying run of the main conveyor between the first and second coating-material loading systems.

More preferable still, the second coating-material loading system comprises a top-coat sprinkling conveyor comprising a transverse support plate and a plurality of laterally-spaced, longitudinally-elongated paddles circulating in an endless orbit with not only a coating-material motivating run where the paddles scrape across the support plate but also a return run. The support plate has a transverse edge over which coating material sprinkles down onto the food-product carrying run of the conveyor.

Correspondingly, the first coating-material loading system comprises bottom-coat sprinkling conveyor comprising a transverse support plate and a plurality of laterally-spaced, longitudinally-elongated paddles circulating in an endless orbit with not only a coating-material motivating run where the paddles scrape across the support plate of the bottom-coat sprinkling conveyor but also a return run. The support plate of the bottom-coat sprinkling conveyor likewise has a transverse edge over which coating material sprinkles down onto the food-product carrying run of the conveyor.

It is another aspect of the invention that the food-product carrying run of the main conveyor comprises a steeply-inclined food-product introduction portion in between the first and second coating-material loading systems, which is where the inflow conveyor transfers food product onto the food-product carrying run.

The steeply-inclined food-product introduction portion of the food-product carrying run of the main conveyor transitions at a transition into a tail portion that extends from the transition to the discharge end of the main conveyor. The tail portion is also inclined but at a shallower slope of climb than the than the steeply-inclined food-product introduction portion. It is a design option to have the tail portion and elongated, but, it does reduce the elevation differential between lowest elevation of the recirculation system below the discharge end of the main conveyor and the highest elevation of the coating-material loading systems. In other words, extending the tail portion and continuing to have it rise reduces the work of the recirculation system.

The recirculation system preferably comprises a transverse collection trough underneath the discharge end of the main conveyor for collection of falling excess-coating material. It further preferably comprises a collection-trough conveyor elongated transversely between an intake end and a discharge end, and comprising an endless belt having an excess-coating material run and a return run. It is a further aspect of the invention that the endless belt of the collection-trough conveyor also comprises a web of solid material.

Wherein, the excess-coating material run collection-trough conveyor is inclined to rise in elevation from the intake end thereof to the discharge end, whereby changing the elevation differential between the discharge end of the collection-trough conveyor and the coating-material loading systems for reducing the work of the recirculation system.

Another aspect of the recirculation system involves left and right transverse collection troughs aligned in a transverse row underneath the discharge end of the main conveyor in for collection of falling excess-coating material. There are, moreover, left and right collection-trough conveyors for the left and right collection troughs respectively, each of which collection-trough conveyors is elongated transversely between an intake end and a discharge end, and comprising an endless belt having an excess-coating material run and a return run.

It is still another aspect of the invention that endless belts of the collection-trough conveyors comprise a web of solid material.

Each of the excess-coating material runs of the left and right flanking return conveyors are inclined to rise in elevation from the intake end of the respective flanking return conveyor to the respective discharge end thereof, whereby changing the elevation differential between the discharge ends of the flanking return conveyors and the coating-material loading systems.

Correspondingly, each of the excess-coating material runs of the left and right collection-trough conveyors are inclined to rise in elevation from an inboard intake end of the respective collection-trough conveyor to an outboard discharge end thereof, whereby changing the elevation differential between the discharge ends of the collection-trough conveyors and the coating-material loading systems and thereby reducing the work of the recirculation system.

It is still another aspect of the invention that the inflow conveyor is cantilevered above the bottom-coat loading provision to introduce an inflow of food product onto the bottom-coated main conveyor between the transverse bottom-coat loading provision and the transverse top-coat sprinkling conveyor.

The food-product coating apparatus summarized above can be operable with just a single counter-flow return conveyor. The single return conveyor can feed the top-coat sprinkling conveyor, which in turn in part feeds the bottom-coat loading provision.

The split pair of collection troughs have their respective intake ends nearly abutted against each other under the mid-span of the discharge end of the main conveyor. They are aligned in a common transverse row, each transverse collecting conveyor carrying collected coating material outboard in opposite directions to the respective flanking conveyor. Preferably there is a peaked diverter disposed above the respective intake ends of the transverse collecting conveyors for diverting falling excess coating material onto one or the other of the transverse collecting conveyors.

Preferably the the inflow conveyor transfers food product onto the inclined introduction portion of the main conveyor. The the top-coat sprinkling provision is preferably positioned between the transition of the food-product carrying run of the main conveyor, and its discharge end.

The retreating transverse edge of the the bottom-coat sprinkling conveyor's support plate preferably vanishes to nothing at the far sidewall, thereby fully discharging the entire charge of recirculated coating material onto the main conveyor. In contrast, the transverse retreating edge of the top-coat sprinkling conveyor's support plate preferably terminates with a remaining longitudinal length to it, forming a shelf about half the original width of the support plate. That way, any remaining recirculated coating material being motivated over the support plate thereby dumps into the flanking conveyor feeding the bottom coat provision. This aspect of the invention provides a design parameter whereby a designer can meter the measure of where more of the coating material is apportioned to the bottom coat than the top coat.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 2 is a perspective view, partly in schematic, showing select components of the food product coating apparatus of FIG. 1 which are otherwise hidden from view by the stainless-steel plate housing therefor (which has been removed from this view), including:—
  the main food-product transit conveyor elongated between a food-product intake end and a coated food-product discharge end,
  a bottom-coat sprinkling conveyor proximate the intake end thereof, and
  a top-coat sprinkling conveyor more intermediate the bottom-coat sprinkling conveyor and the discharge end thereof,
and then there is also:—
  an elongated compressor cylinder (shown in broken lines),
  left and right, split, transverse collection-recirculation conveyors just below the discharge end of the main food-product transit conveyor,
  left and right counter-flow return conveyors flanking the left and right sides of the main food-product transit conveyor (which are pretty much shown in broken lines),
  an inflow conveyor (shown in broken lines), and
  an outflow conveyor (shown in broken lines);

FIG. 3 is an enlarged-scale perspective view comparable to FIG. 2 except showing in enlarged detail:—
  the bottom-coat sprinkling conveyor,
  portions of the main food-product transit conveyor proximate the intake end, and
  portions of the right-side counter-flow feed conveyor proximate the discharge end thereof, and, which portions are proximate the intake end of the main conveyor;

FIG. 4 is a top plan view of FIG. 3, partly in section, and taken along line IV-IV in FIG. 1, which is through the axles of the rollers (or sprockets) of the bottom-coat sprinkling conveyor such that the upper row of paddles removed from view; and FIG. 5 is an enlarged scale end elevation view, taken in the direction of arrows V-V of FIG. 2, and partly in schematic like FIG. 2 as well.

DETAILED DESCRIPTION OF THE PREFERRED EMBODIMENTS

Figure 1:
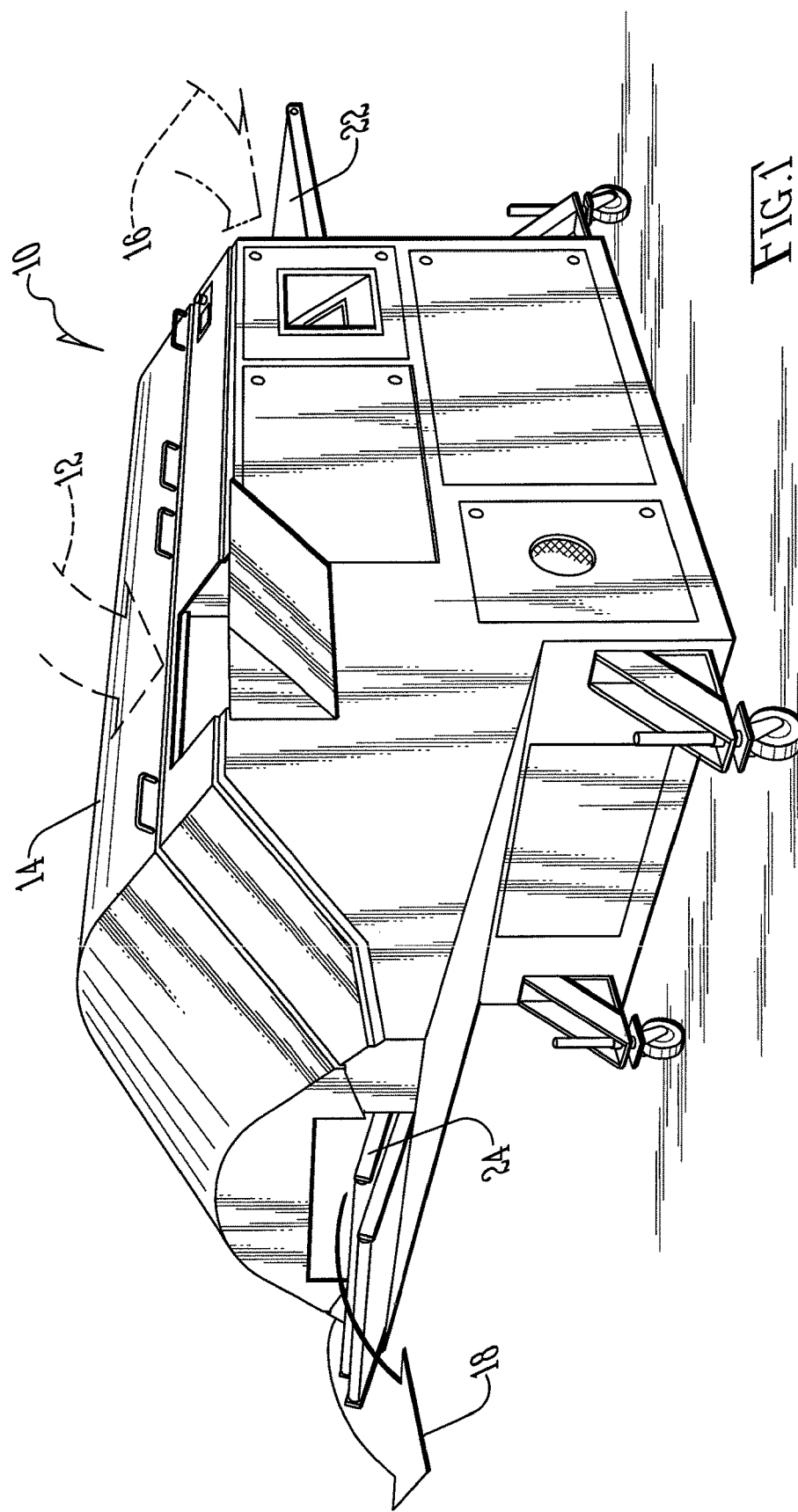
FIG. 1 is a perspective view of a food product coating apparatus in accordance with the invention for handling Panko crumb (ie., a Japanese-inspired bread crumb concoction) as the coating material, or else other Panko-like materials as well.

FIG. 1 shows a food-product coating apparatus 10 in accordance with the invention for handling Panko crumb (ie., a Japanese-inspired bread crumb concoction) as the coating material 12, or else other Panko-like materials as well.

The apparatus 10 comprises a stainless steel plate housing 14 that is elongated between an inflow end for food product 16 which is incoming for coating, and, an outflow end discharging coated-food product 18. The food-product inflow end receives an inflow of food product 16, typically from conveyors of upline process machines (not shown). The coated-food product outflow end discharges an outflow of coated-food product 18 (and typically to conveyors of downline process machines, also not shown). Needless to say, coating operations take place between the two ends (and inside the housing 14).

In use, said apparatus 10 is periodically re-charged with a load of coating material 12, as indicated in FIG. 1. The re-charging operation need not be continuous. Indeed, the apparatus 10 is designed to operate on batch charging. That is, at any given moment, only a very minor fraction of the coating material 12 is exiting the apparatus 10 as a coating layer on the outflow of coated-food product 18. Typically, the major fraction of the coating material 12 is re-circulated over and over inside said apparatus 10 to give the recirculated coating material 12 a renewed chance at becoming a coating layer on the outflow of coated-food product 18.

Once the apparatus 10 is fully charged (or nearly so), said apparatus 10 constantly recirculates the coating material 12 inside itself. Again, only a very minor fraction of the coating material 12 is exiting the apparatus 10 at any given time, as in the form of a coating layer on the coated-food product 18. Nevertheless, after enough elapse of time, the charge of coating material 12 in the apparatus 10 will deplete slowly to near depletion. Then, the apparatus 10 requires recharging. Nevertheless, the apparatus 10 is designed for operating without attention for fairly long intervals of time between necessary rechargings. It is an object of the invention that this apparatus 10 need not be attended by an ever-vigilant overseer. That is, this apparatus 10 is designed to run on its own for a long interval of time. Still, it will need recharging now and then. A control system with fill-level sensors or timers can provide alarms or indicators and the like.

A constant inflow of food product 16 is supplied to the apparatus 10 typically by upline conveyors (not shown) that transfer the flow of food product 16 onto an inflow conveyor 22 for the apparatus 10. The inflow conveyor 22 preferably comprises without limitation an endless belt configuration of conventional open wire mesh construction. See, eg., U.S.

Pat. No. 6,305,274—Nothum, Sr., et al., and FIG. 6 therein. The inflow conveyor 22 is elongated between an intake end (FIG. 1 hereof) and a discharge end (FIG. 2 hereof). The inflow conveyor 22 furthermore has an upper food-product carrying run and a lower return run.

Similarly, coated-food product 18 exits said apparatus 10 on an outflow conveyor arrangement 24. Various arrangements are possible. The outflow conveyor arrangement 24 might comprise a plurality of conveyors arranged in a series to form short vertical drops for the coated-food product 18 (see, eg., FIG. 1 hereof, but also see U.S. Pat. No. 6,158,332—Nothum, Sr., et al., and FIG. 2 therein).

The purpose of the short drops is to shake off excess coating material 12 on the coated-food product 18 that is not firmly adhered to the coating layer as a whole. Alternatively, the outflow conveyor arrangement 24 might comprise a single conveyor. See, eg., U.S. Pat. No. 7,231,885—Nothum, Sr., et al., and FIG. 1 therein. The outflow conveyor 24 might be with a thumper or vibrator, so as to give the coated-food product 18 a bumpy ride. Which is for the same purpose of knocking off excess coating material 12. And so on, there being various designs for shaking excess coating material 12 off the coated-food product 18, and keeping the shaken off coating material 12 within the confines of a recirculation system within said apparatus 10 (see, eg., FIG. 2 hereof).

Assuming the outflow conveyor arrangement is a single conveyor, the outflow conveyor 24 preferably comprises without limitation an endless belt configuration of conventional open wire mesh construction. See, eg., U.S. Pat. No. 6,305,274—Nothum, Sr., et al., and FIG. 6 therein. The outflow conveyor 24 is elongated between an intake end (FIG. 2 hereof) and a discharge end (FIG. 1 hereof). The outflow conveyor 24 furthermore has an upper food-product carrying run and a lower return run.

As said, the outflow conveyor 24 is preferably an endless belt of open wire mesh construction, and having an upper food-product carrying run and lower return run. The shaken-off excess coating material 12 can simply sift through both the upper and lower runs, and be collected by components in accordance with the invention more particularly described below.

Ultimately, the outflow conveyor 24 transfers the coated-food product 18 to succeeding downline processes (not shown).

FIG. 2 shows select components of the food product coating apparatus 10 of FIG. 1 which are otherwise hidden from view by the stainless-steel plate housing 14 therefor. These select components include:— the main food-product transit conveyor 20 elongated between a food-product intake end 26 and a coated food-product discharge end 28,
a bottom-coat sprinkling conveyor 32 proximate the intake end thereof, and
a top-coat sprinkling conveyor 34 intermediate the bottom-coat sprinkling conveyor 32 and the discharge end 28 thereof, and then there is also:— an elongated compressor cylinder 36 (shown in broken lines),
left and right, split, transverse collection conveyors 42 just below the discharge end 28 of the main food-product transit conveyor 20,
left and right counter-flow return conveyors 44 flanking the left and right sides of the main food-product transit conveyor 20 (pretty much shown in broken lines),
an inflow conveyor 22 (shown in broken lines), and
an outflow conveyor 24 (shown in broken lines).

Of the foregoing, the following conveyors preferably are endless belts of solid web material, namely:— the main food-product transit conveyor 20,
the left and right, split, transverse collection conveyors 42, and
the left and right counter-flow return conveyors 44 flanking the left and right sides of the main food-product transit conveyor 20.

The open wire mesh construction inflow conveyor 22, and, the open wire mesh construction outflow conveyor 24 are shown in FIG. 2 in broken lines. But again, their open wire mesh construction is in high contrast to the solid web belts.

The main food-product transit conveyor 20 comprises an endless belt of a solid web material having an upper food-product carrying run and a lower return run. The upper food-product carrying run has a relatively steeply-inclined food-product introduction portion 46. The food-product introduction portion 46 transitions into longitudinally-elongated tail portion 48. It is a design preference but without being limited to the preference that the tail portion 48 is also inclined, albeit at a much shallower climb angle. Without limitation, the tail portion 48 could also be level or run-out at a shallow decline, or do anything else, like valleys and ridges. One of the design aspects of the tail portion 48 is to give said apparatus 10 sufficient longitudinal length for the functioning of the recirculation system in accordance with the invention.

To revisit the relatively steeply-inclined food-product introduction portion 46, this is an aspect of the invention which Panko coating material 12 allows but probably dry particulate coating material 12 probably would not. And, the higher the moisture content of the Panko, perhaps even the steeper the angle the introduction portion 46 can be inclined. In other words, there is almost an inherent glue-like quality of Panko that is absent in dry particulate. Panko tends to self adhere to the slope.

In FIG. 2, the open wire mesh inflow conveyor 22 is cantilevered over the intake end 26 of the main conveyor 20, and, is cantilevered over as well the bottom-coat sprinkling conveyor 32. That is, the inflow conveyor 22 is cantilevered above the elevation of the bottom-coat sprinkling conveyor 32. The discharge end of the inflow conveyor 22 discharges food product 16 onto the bottom-coated main conveyor 20 approximately near the transition between the steeply-inclined food-product introduction portion 46, and, the tail portion 48.

In FIG. 2, the discharge end 28 of the main conveyor 20 transfers coated-food product 18 onto the intake end of the outflow conveyor 24. The outflow conveyor 24 might be provided with a vibrator (not shown, but refer to U.S. Pat. No. 6,158,332—Nothum, Sr., et al.). The purpose would be to initially give the coated-food product 18 a bumpy ride to shake off loosely clinging Panko coating material 12.

In this configuration, the main conveyor 20 and outflow conveyor 24 form a seam where the major fraction of excess coating material 12 can pour through and land in a pair of left and right collection troughs 52 (shown in FIG. 5). A minor fraction of excess coating material 12 will be shaken off coat-food product over the span of the near margin to the intake end of the outflow conveyor 24. That minor fraction of excess coating material 12 will sift through the open wire mesh outflow conveyor 24 and also land in the collection troughs 52. An altogether different minor fraction of coating material 12 optimally winds up being a successful coating layer on coated-food product 18. And, it optimally stays there until it can be set by frying or baking by further downline process (which are not shown).

FIG. 5 is an end elevational view of the food product coating apparatus 10 in accordance with the invention for handling Panko or Panko-like materials as the coating material 12. This view shows the discharge end 28 of the main conveyor 20.

In accordance with one preferred embodiment, the main conveyor 20 is approximately four feet (~1.2 m) wide. The main conveyor 20 is an endless belt and in these views, the main conveyor 20 changes direction around a nose roller at the discharge end 28 such that an upper run (which is the food-product carrying run) returns via a lower return run to another nose roller (not in view, but see FIG. 2) at the intake 26 end of the main conveyor 20.

Staying in FIG. 5, the main conveyor 20 is flanked by low sidewalls 54 for keeping the coating material 12 confined on the food-product carrying run of the main conveyor 20. The major fraction of the excess coating material 12 rolls over the edge of the discharge end 28 of the main conveyor 20, and pours into either the left or right collection troughs 52 underneath the edge of the discharge end. Moreover, a minor fraction of excess coating material 12 not adhering to the outflowing coated-food product 18 will sift through the open mesh wire outflow conveyor 24 and furthermore into the collection troughs 52. The collection troughs 52 are spaced apart in the lateral center by a gap. The gap is spanned by inverted-V shaped partition 56. Panko falling onto that partition 56 are diverted into either the left or right collection troughs 52.

Installed inside each collection trough 52 is one of the split, transverse collection conveyors 42. Each transverse collection conveyor 42 is an elongate endless belt extending between an inboard intake end and an outboard discharge end. Each transverse collection conveyor 42 has an upper excess-coating material 12 carrying run and a lower return run. Moreover, the transverse collection conveyors 42 are preferably and without limitation about six inches (~15 cm) wide.

FIGS. 2 and 5 show the split arrangement of the transverse collection conveyors 42. They are arranged in a wide and flattened V-shape. The left transverse collection conveyor 42 (right side in this view) feeds the left flanking counter-flow return conveyor 44, and a right one vice versa.

FIG. 5 is an enlarged-scale view showing the left and right idle rollers for the left and right split, transverse collection conveyors 42. The discharge end of the right transverse circulation conveyor 42 discharges recirculated-excess coating into the the right-side flanking counter-flow return conveyor 44, proximate the intake end thereof. Again and as mentioned previously, this right-side flanking counter-flow return conveyor 44 ultimately discharges in and/or feeds recirculated-excess coating material 12 to the bottom-coat sprinkling conveyor 32 as shown in FIG. 2 and as shown better in FIG. 3 or 4.

FIG. 5 shows the main food-product transit conveyor 20 being flanked by a pair of left and right, counter-flow return conveyors 44 (the left-side flanking conveyor 44 is on the right side in these views, and vice versa for the right-side flanking conveyor 44). The flanking counter-flow conveyors 44 are preferably and without limitation about six inches (~15 cm) wide, and sit in shallow stainless steel troughs 58 for them to contain the Panko from spilling off the sides. The tail portion 48 of the food-product carrying run of the main conveyor 20 climbs a shallow angle (eg., which is upwards as the main conveyor 20 approaches the discharge end 28). Again, the tail portion 48 might alternatively be—not an incline, but—level, or a decline, or else something other. Conversely, the flanking counter-flow conveyors 44 are tilted to climb relatively steeper angles, which is upwards as they recede into the background in FIG. 5, in order to get higher than the main conveyor 20 towards the intake end 26. As FIG. 2 shows, the right-side flanking conveyor 44 feeds recirculated coating material 12 back to the bottom-coat sprinkling conveyor 32. The left-side flanking conveyor 44 feeds recirculated coating material 12 back to the top-coat sprinkling conveyor 34. Both sprinkling conveyors are suspended over the width of the main conveyor 20.

It is an aspect of the invention that the main conveyor 20, the split transverse collection conveyors 42, and, the flanking left and right counter-flow return conveyors 44 in accordance with the invention are all preferably of solid web material construction. That way, the solid web material construction avoids the shortcomings of working with open wire mesh or drag link construction.

FIG. 2 shows the intake end 26 of the main conveyor 20 in accordance with the invention, as well as the pair of sprinkling (or sifting) conveyors. The upper sprinkling conveyor comprises the aforementioned top-coat sprinkling conveyor 34. The lower conveyor comprises the bottom-coat sprinkling conveyor 32. The right-side flanking conveyor 44 feeds the bottom-coat sprinkling conveyor 32 with recirculated-excess coating material 12. The left-side flanking conveyor 44 feeds the top-coat sprinkling conveyor 34 with recirculated-excess coating material 12.

FIG. 2 shows that the product-carrying run of the main conveyor 20 begins with the steep climb of food-product introduction portion 46. The food-product introduction portion 46 climbs from underneath the bottom-coat sprinkling conveyor 32 to a higher elevation but still underneath top-coat sprinkling conveyor 34. The rest of the run for the product-carrying run (ie., the tail portion 48) shallows off to a shallow climb. Food product 16 is loaded onto the main conveyor 20 between the elevations of the bottom-coat sprinkling conveyor 32 and the top-coat sprinkling conveyor 34.

FIGS. 3 and 4 show how the bottom-coat sprinkling conveyor 32 works, and is representative of how the top-coat sprinkling conveyor 34 works as well. FIGS. 3 and 4 show that the right-side flanking conveyor 44 feeds the transverse bottom-coat sprinkling conveyor 32 with recirculated-excess coating material 12 (once again, the right-side flanking conveyor 44 is on the left side in these views).

The bottom-coat sprinkling conveyor 32 comprises an endless strand 62 elongated between an intake end 64 (left in the FIGS. 3 and 4) and a discharge end 66 (right in FIGS. 3 and 4). It is a non-exclusive design option that this endless strand 62 comprise a metal chain. Hence this chain 62 is driven in a transverse endless loop between the intake and discharge ends 64 and 66 thereof.

Attached to this chain 62 is a plurality of spaced paddles 68. The paddles 68 extend between base ends attached by fixtures to the endless chain 62, and, terminal free ends that point in the longitudinal direction of the flow of food product 16. The paddles 68 travel transverse to the longitudinal flow of the food product 16 in an upper transverse return run and a lower coating-material motivating run. The chain 62 and paddles 68 make the turns where the upper run changes to become the lower run (and vice versa) at spaced rollers 72 (or sprockets). Hence the paddles 68 orbit in a squashed, transverse oval over the main conveyor 20.

During the lower run (ie., the coating material-motivating run) the paddles 68 have bottom edges which scrape across a support plate 74. During the return run, the paddles 68 are supported in mid-air at their mid-points by a transverse rib 76. The support plate 74 has spaced transverse edges 82 and 84. One transverse edge 82 is angled on a diagonal axis relative the longitudinal flow direction of food product 16. That is, this angled transverse edge 82 recedes from a thickest width of the support plate 74 at the intake end 64 of the bottom-coat sprinkling conveyor 32, to the thinnest width of the support plate 74 at the discharge end 66 of the bottom-coat sprinkling conveyor 32. This is where the paddles 68 roll-up back around the roller 72 (or sprocket) proximate the discharge end 66 to continue transit in the upper run.

As FIGS. 3 and 4 show better, the right-side flanking conveyor 44 has an upper discharge end elevated above the intake end 64 of the bottom-coat sprinkling conveyor 32, and proximate where the return run of the paddles turn around the roller 72 (or sprocket) which begins the paddles run as the lower, coating-material motivating run. This is also where the support plate 74 is widest. The right-side flanking conveyor 44 discharges recirculated coating material 12 onto the support plate 74. The paddles 68 motivate the coating material 12 across the support plate 74 in virtual transverse lanes, as indicated by arrows 12 in FIG. 4. As the coating material 12 traveling in a given transverse lane intersect the receding transverse edge 82 of the support plate 74, suddenly nothing is underneath the coating material 12. And thus coating material 12 sprinkles down from the bottom-coat sprinkling conveyor 32, almost in a virtually continuous curtain across the width of the receding transverse edge 82.

The far end of the support plate 74 vanishes to nothing, so that all the coating material 12 is dumped onto the main conveyor 20 below.

As FIG. 2 shows, top-coat sprinkling conveyor 34 has a corresponding endless strand (eg., chain) and a plurality of paddles 86 which, during transit across a lower (and coating-material motivating) run, scrape across a counter-part support plate 88. The endless strand for these paddles 86 also extends between an intake end and discharge end, but the intake end of the top-coat sprinkling conveyor 34 is on the left-side of the main conveyor 20. The top-coat sprinkling conveyor 34 runs in a counter-rotational direction relative to the bottom-coat sprinkling conveyor 32. Its support plate 88 likewise has a receding transverse edge over which coating material 12 spills in a virtual continuous curtain. But the receding edge of this support plate 88 does not intersect with its counter-part transverse. The receding edge of this support plate 88 does not terminate in a sharp point with its counter-part transverse edge at about the discharge end of the top-coat sprinkling conveyor 34.

Instead, the retreating transverse edge of this support plate 88 for the top-coat sprinkling conveyor 34 only narrows in to the spaced transverse edge at about half the angle as with the support plate 74 bottom-coat sprinkling conveyor 32. Hence the receding edge of the support plate 88 of the top-coat sprinkling conveyor 34 does not actually intersect the counter-part spaced away transverse edges. Conversely, the two transverse edges for this support plate 88 terminate at the discharge end of the top-coat sprinkling conveyor 34 and, as a result, form an abbreviated shelf.

The abbreviated shelf for this support plate 88 is only about half the width of the support plate 88 where it is widest (which is at the intake end of the top-coat sprinkling conveyor 34).

So the coating-material motivating run of the top-coat sprinkling conveyor 34 does not reach the discharge end to where the support plate 88 vanished to nothing. To the contrary, about half the width of the support plate 88 remains. Correspondingly, about half the flow of coating material 12 supplied to the top-coat sprinkling conveyor 34 gets dumped into the trough 58 for the right-side flanking conveyor 44, which in turn feeds the bottom-coat sprinkling conveyor 32.

With the bottom-coat sprinkling conveyor 32, it is a design aspect that the support plate 74 vanishes to nothing proximate the discharge end so that the entire load of coating material 12 is sprinkled onto the main conveyor 20. It is another design preference that the distribution of coating material 12 is rather evenly distributed across the whole width of the main conveyor 20. It is a further design preference that there is no coating material 12 left on the support plate 74 at the discharge end 66 of the bottom-coat sprinkling conveyor so that coating-material is not driven against and compacted into a far sidewall. However, with the top-coat sprinkling conveyor 34, it is a contrasting design aspect to save some of the original feed of coating material 12 from the left-side flanking conveyor 44 for feeding into the trough 58 for the right-side flanking conveyor 44.

This provides a design capability of metering what relative percentages of the coating material 12 in the overall recirculation loop are fed to the bottom-coat sprinkling conveyor 32 versus the top-coat sprinkling conveyor 34. Look at FIG. 5, it can be assumed that half the excess-coating material 12 is going to land in the left transverse collection conveyor 42, and the other half in the right transverse collection conveyor 42. Each left and right transverse collection conveyor 42 discharges all of its load onto the left and right flanking conveyors 44 respectively. So initially, at least near their intake ends, the flanking conveyors 44 are carrying equal loads of the coating material in the overall recirculation loop of about one-half each.

However, the top-coat sprinkling conveyor 34 is actually going to sprinkle only one half of its delivered load of coating material 12 onto the main conveyor 20. The top-coat sprinkling conveyor 34 will pass-through the other half of its delivered load of coating material 12 to the opposite side trough 58 that has the counter-flow conveyor 44 feeding the bottom-coat sprinkling conveyor 32. Needless to say, half of a half is a quarter. In consequence, the top-coat sprinkling conveyor 34 is only sprinkling about a quarter of the total load of the excess-recirculated coating material 12 in the overall recirculation loop; the bottom-coat sprinkling conveyor 32, about three-quarters.

In use, the bottom-coat sprinkling conveyor 32 lays down a bottom-coat of coating material 12 on the steeply-inclined introduction portion 46 of the food-product carrying run of the main conveyor 20. Food product 16 is introduced on top of the bottom-coat of coating material 12 before the product-carrying run of the main conveyor 20 transits underneath the top-coat sprinkling conveyor 34. Preferably, the product-carrying run of the main conveyor 20 has preferably transited past the transition to the tail portion 48. The particular food product 16 can be many things, from meat products (chicken, beef, pork, fish and shellfish) to vegetables and so on:—including not just potatoes but from eggplant to everything. When the food product 16 lands on the bottom coat, the food product 16 picks up a bottom coat. Thus the partially-coated food product 18 flows underneath the top-coat sprinkling conveyor 34 where, after that experience, the coated-food product 18 shall be fairly thoroughly coated in all three-dimensions of its surface. The compressor cylinder 36 is disposed to roll over the coated-food product 18 and slightly press in the coating layer.

As described above, the discharge end 28 of main conveyor 20 is disposed above a pair of split collection troughs 52 for catching the dropped-off or knocked-off excess coating material 12. The outflow conveyor 24 has an open wire mesh construction. Coated-food product 18 is transferred from the main conveyor 20 to the outflow conveyor 24, forming a seam above the split collection troughs 52 of the transverse collection conveyors 42.

Excess coating material 12 not adhering to outflowing coated-food product 18 drops through seam, or else a knocked off fraction of the coating material 12 sifts through the open wire mesh of the outflow conveyor 24, and into one or the other of the collection troughs 52.

And so on, whereby the intended mode of operating has the excess coating material 12 being constantly recirculated in split recirculation loops without a fresh recharging, until the coating material 12 in the overall recirculation loop (ie., the sum of coating material in the split loops) is nearly depleted.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A food-product coating method for coating material with a consistency comparable to moist spongy particulate, comprising the steps of:
    driving an endless main conveyor belt comprising a web of solid material from an intake end to a discharge end and forming an upper food-product carrying run and a lower return run;
    loading a stream of a bottom coat of coating material on the food-product carrying run beginning with or proximate the intake end;
    loading food product on the bottom coat on the food-product carrying run;
    dispensing a stream of a top coat of coating material on the food product and bottom coat on the food-product carrying run wherein some of the coating material adheres to the food product while the rest generally comprises loose excess coating material;
    wherein the food-product is loaded onto the food-product carrying run by a food-product inflow conveyor adapted to transfer an inflow of food product to the food-product carrying run of the main conveyor between where the bottom coat is loaded on the food-product carrying run and where the top coat of coating material is dispensed on the food product;
    wherein the bottom coat loading comprises loading excess-coating material transversely across the food-product carrying run of the main conveyor proximate the intake end; and top coat loading comprises sprinkling excess-coating material transversely across the food-product carrying run of the main conveyor between the bottom coat loading and the discharge end of the main conveyor;
    wherein the top coat loading is performed by a top-coat sprinkling conveyor comprising a transverse support plate and a plurality of laterally-spaced, longitudinally-elongated paddles circulating in an endless orbit with not only a coating-material motivating run where the paddles scrape across the support plate but also a return run; and the transverse support plate has a transverse edge over which coating material sprinkles down onto the food-product carrying run of the main conveyor
    discharging the coated food product past the discharge end;
    recovering the excess coating material past the discharge end and recirculating the excess coating material to one, the other, or both of the streams of the top coat and bottom coat.

2. The method of claim 1, wherein:
    the endless belt of the main conveyor comprises a web of substantially imperforate material.

3. The method of claim 1, wherein:
    the bottom coat loading comprises a bottom-coat sprinkling conveyor comprising a transverse support plate and a plurality of laterally-spaced, longitudinally-elongated paddles circulating in an endless orbit with not only a coating-material motivating run where the paddles scrape across the support plate of the bottom-coat sprinkling conveyor but also a return run; and
    the support plate of the bottom-coat sprinkling conveyor has a transverse edge over which coating material sprinkles down onto the food-product carrying run of the main conveyor.

4. The method of claim 1, wherein:
    wherein the food-product carrying run of the main conveyor comprises a steeply-inclined food-product introduction portion in between the bottom coat loading and the top coat loading;
    wherein the steeply-inclined food-product introduction portion of the food-product carrying run of the main conveyor transitions at a transition into a tail portion that extends from the transition to the discharge end of the main conveyor; and
    the tail portion is inclined but at a shallower slope of climb than the steeply-inclined food-product introduction portion, whereby changing an elevation differential between the discharge end of the main conveyor and the coating-material loading systems for reducing the work of the recirculation of the excess coating material.

5. The method of claim 1, wherein:
    recovering and recirculating the excess coating material comprises a transverse collection trough underneath the discharge end of the main conveyor for collection of falling excess coating material; and
    further comprises a collection-trough conveyor elongated transversely between an intake end and a discharge end, and comprising an endless belt having an excess-coating material run and a return run.

6. The method of claim 5, wherein:
    the endless belt of the collection-trough conveyor comprises a web a web of substantially imperforate material.

7. The method of claim 6, wherein:
    the endless belt of the collection-trough conveyor comprises a web a web of solid material.

8. The method of claim 5, wherein:
    the excess-coating material run collection-trough conveyor is inclined to rise in elevation from the intake end thereof to the discharge end.

9. The method of claim 1, wherein:
    recovering and recirculating excess coating material comprises left and right transverse collection troughs aligned in a transverse row underneath the discharge end of the main conveyor for collection of falling excess-coating material; and further comprises a left and right collection-trough conveyor for the left and right collection troughs respectively, each of which collection-trough conveyors is elongated transversely between an intake end and a discharge end, and comprising an endless belt having an excess-coating material run and a return run.

10. The method of claim 9, wherein:
each of the endless belts of the collection-trough conveyors comprise a web of substantially imperforate material.

11. The method of claim 10, wherein:
each of the endless belts of the collection-trough conveyors comprise a web of solid material.

12. The method of claim 9, wherein:
recovering and recirculating excess coating material comprises further comprises left and right flanking return conveyors for returning the excess-coating material to one or the other of the first and second coating-material spreading systems;
each of which flanking return is elongated transversely between an intake end and a discharge end, and has an endless belt having an excess-coating material run and a return run; and
the left and right collection-trough conveyors discharge excess-coating material into the intake end of the respective left and right flanking conveyor.

13. The method of claim 12, wherein:
wherein each of the endless belts of the left and right flanking conveyors comprise a web of substantially imperforate material.

14. The method of claim 13, wherein:
wherein each of the endless belts of the left and right flanking conveyors comprise a web of solid material.

15. The method of claim 12,
wherein the each of the excess-coating material runs of the left and right flanking return conveyors are inclined to rise in elevation from the intake end of the respective flanking return conveyor to the respective discharge end thereof, thereby changing an elevation differential between the discharge ends of the flanking return conveyors and the coating-material loading systems.

16. The method of claim 15, wherein:
bottom coat loading comprises a bottom-coat sprinkling conveyor comprising a transverse support plate and a plurality of laterally-spaced, longitudinally-elongated paddles circulating in an endless orbit with not only a coating-material motivating run where the paddles scrape across the support plate of the bottom-coat sprinkling conveyor but also a return run; and
the support plate of the bottom-coat sprinkling conveyor has a transverse edge over which coating material sprinkles down onto the food-product carrying run of the conveyor.

\* \* \* \* \*